United States Patent
Aggarwal et al.

(10) Patent No.: US 11,683,238 B2
(45) Date of Patent: *Jun. 20, 2023

(54) NETWORK MANAGEMENT BASED ON MODELING OF CASCADING EFFECT OF FAILURE

(71) Applicant: Utopus Insights, Inc., Valhalla, NY (US)

(72) Inventors: Aanchal Aggarwal, White Plains, NY (US); Younghun Kim, Pleasantville, NY (US); Tarun Kumar, Chappaqua, NY (US); Mark A. Lavin, Katonah, NY (US); Giuliano Andrea Pagani, Groningen (NL); Abhishek Raman, Mahopac, NY (US)

(73) Assignee: Utopus Insights, Inc., Valhalla, NY (US)

( * ) Notice: Subject to any disclaimer, the term of this patent is extended or adjusted under 35 U.S.C. 154(b) by 866 days.

This patent is subject to a terminal disclaimer.

(21) Appl. No.: 16/546,276

(22) Filed: Aug. 20, 2019

(65) Prior Publication Data
US 2020/0112488 A1 Apr. 9, 2020

Related U.S. Application Data

(63) Continuation of application No. 14/665,316, filed on Mar. 23, 2015, now Pat. No. 10,389,600.

(51) Int. Cl.
*H04L 41/14* (2022.01)
*H04L 41/0631* (2022.01)
(Continued)

(52) U.S. Cl.
CPC ............ *H04L 41/145* (2013.01); *G06N 7/01* (2023.01); *H04L 41/065* (2013.01);
(Continued)

(58) Field of Classification Search
CPC ...... G06N 7/005; G06N 20/00; G06N 99/005; H04L 41/142; H04L 41/145; H04L 41/065; Y04S 40/166
See application file for complete search history.

(56) References Cited

U.S. PATENT DOCUMENTS 8,401,709 B2 3/2013 Cherian
8,504,214 B2 8/2013 Genc
(Continued)

FOREIGN PATENT DOCUMENTS

WO 2004052073 6/2004

OTHER PUBLICATIONS

List of IBM Patents or Patent Applications Treated as Related; (Appendix P), Filed Jul. 9, 2015; 2 pages.
(Continued)

*Primary Examiner* — Li Wu Chang
(74) *Attorney, Agent, or Firm* — Ahmann Kloke LLP (57) ABSTRACT

A system and method of managing a network with assets are described. The method includes generating a directed graph with each of the assets represented as a node, determining individual failure probability of each node, computing downstream failure probability of each node according to an arrangement of the nodes in the directed graph, computing upstream failure probability of each node according to the arrangement of the nodes in directed graph, and computing network failure probability for each node based on the corresponding individual failure probability, the downstream failure probability, and the upstream failure probability. Managing the network is based on the network failure probability of the assets.

23 Claims, 7 Drawing Sheets

(51) Int. Cl.
*H04L 41/142* (2022.01)
*G06N 7/01* (2023.01)
*G06N 20/00* (2019.01)

(52) U.S. Cl.
CPC ........ *H04L 41/0636* (2013.01); *H04L 41/142* (2013.01); *G06N 20/00* (2019.01); *Y04S 40/00* (2013.01)

(56) References Cited

U.S. PATENT DOCUMENTS

| | | | |
|---|---|---|---|
| 8,751,421 | B2 | 6/2014 | Anderson |
| 2005/0034023 | A1 | 2/2005 | Maturana |
| 2005/0036418 | A1 | 2/2005 | Kim |
| 2013/0124001 | A1 | 5/2013 | Bhageria |
| 2013/0282189 | A1 | 10/2013 | Stoupis |
| 2014/0198630 | A1 | 7/2014 | Nof |
| 2015/0051749 | A1* | 2/2015 | Hancock ............ G01R 21/1331 700/295 |
| 2015/0135012 | A1* | 5/2015 | Bhalla ................ H04L 41/0631 714/26 |
| 2015/0331063 | A1 | 11/2015 | Ji |
| 2016/0283874 | A1 | 9/2016 | Aggarwal |
| 2016/0283915 | A1 | 9/2016 | Aggarwal |
| 2016/0285675 | A1 | 9/2016 | Aggarwal |
| 2016/0285689 | A1 | 9/2016 | Aggarwal |
| 2016/0285691 | A1 | 9/2016 | Aggarwal |

OTHER PUBLICATIONS

List of IBM Patents or Patent Applications Treated as Related; (Appendix P), Filed Mar. 23, 2015; 2 pages.

Ahsan, Q., "Reliability of Two Interconnected Systems with Jointly Owned Units," International Journal of Electrical Power & Energy Systems, vol. 17, No. 6, Elsevier Science Ltd., 1995, pp. 363-370.
Bonafede et al. "Bayesian Networks for Enterprise Risk Assessment," 2006, 11 pages, https://arxiv.org/pdf/physics/0607226.pdf.
Dobson et al., "A Branching Process Approximation to Cascading Load-Dependent System Failure," Thirty-seventh Hawaii International Conference on System Sciences, Jan. 2004, pp. 1-10.
Dobson et al., "Probabilistic Load-Dependent Cascading Failure with Limited Component Interactions," IEEE International Symposium on Circuits and Systems, May 2004, pp. 1-4.
Dong et al., "Evaluating Delivery Point Reliability Performance for Network Configurations," Proceedings of the 1999 IEEE Canadian Conference on Electrical and Computer Engineering, May 9-12, 1999, pp. 1-6.
Hamoud et al., "Assessment of Component Criticality in Customer Delivery Systems," 8th International Conference on Probabilistic Methods Applied to Power Systems, Sep. 12-16, 2004, pp. 1-7.
Hilber, Patrik, "Component Reliability Importance Indices for Maintenance Optimization of Elecliical Networks," Licentiate Thesis, Royal Institute of Technology, 2005, pp. 1-94.
Kinney et al., "Modeling Cascading Failures in the North American Power Grid," Eur. Phys. J. B. 46, 2005, pp. 101-107.
Pan et al., "Condition Based Failure Rate Modeling for Electric Network Components," 2009 IEEE/PES Power Systems Conference and Exposition, 2009, pp. 1-6.
Soltan et al., "Cascading Failures in Power Grids—Analysis and Algorithms," Columbia University, Electrical Engineering Technical Report, Jan. 2014, pp. 1-16.
Steinder, Malgorzata et al., "Probabilistic Fault Localization in Communication Systems Using Belief Networks," IEEE/ACM Transactions on Networking, vol. 12, No. 5, pp. 809-822, Oct. 2004.
Zio et al., "Estimation of Cascade Failure Probability in Electrical Transmission Networks by Subset Simulation," Reliability, Risk and Safety—Ale, Papazoglou & Zio (eds.), 2010, pp. 1-5.

* cited by examiner

NETWORK MANAGEMENT BASED ON MODELING OF CASCADING EFFECT OF FAILURE

CROSS-REFERENCE TO RELATED APPLICATIONS

This application is a continuation of U.S. patent application Ser. No. 14/665,316, filed on Mar. 23, 2015 and entitled "NETWORK MANAGEMENT BASED ON MODELING OF CASCADING EFFECT OF FAILURE", which is incorporated herein by reference in its entirety.

BACKGROUND

The present invention relates to management of a network, and more specifically, to network management based on modeling of the cascading effect of failures.

There are many types of networks that include a number of assets that affect each other. Exemplary networks with a number of interdependent assets include a power network (power grid), gas network, and a water network. For example, a power network includes electrical assets (e.g., transformers, switches, fuses) and non-electrical assets (e.g., support structures, poles), each of which can not only fail but also damage other assets within the network.

SUMMARY

According to one embodiment of the present invention, a method of managing a network with assets includes generating, using a processor, a directed graph with each of the assets represented as a node; determining individual failure probability of each node; computing, using the processor, downstream failure probability of each node according to an arrangement of the nodes in the directed graph; computing, using the processor, upstream failure probability of each node according to the arrangement of the nodes in the directed graph; computing network failure probability for each node based on the corresponding individual failure probability, the downstream failure probability, and the upstream failure probability; and managing the network based on the network failure probability of the assets.

According to another embodiment, a network management system to manage assets of the network includes a memory device configured to store instructions, and a processor configured to process the instructions to compute network failure probability associated with each asset based on determining individual failure probability, upstream failure probability, and downstream failure probability for each asset, and to manage the network based on the network failure probabilities of the assets.

According to yet another embodiment, a computer program product includes a tangible storage medium readable by a processing circuit and storing instructions for execution by the processing circuit to perform a method of managing a network with assets. The method includes generating a directed graph with each of the assets represented as a node; determining individual failure probability of each node; computing downstream failure probability of each node according to an arrangement of the nodes in the directed graph; computing upstream failure probability of each node according to the arrangement of the nodes in the directed graph; computing network failure probability for each node based on the corresponding individual failure probability, the downstream failure probability, and the upstream failure probability; and managing the network based on the network failure probability of the assets.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, a network may include a number of assets whose failure affects the individual asset as well as other assets of the network. An accurate assessment of failures and the cascading effect of failures in the network facilitate management of the network. The areas of vulnerability may be identified and addressed. Embodiments of the methods and systems discussed herein relate to modeling the cascading effect of failures in a network and managing the network accordingly. While a power network and associated (electrical and non-electrical) assets are discussed below for explanatory purposes, the embodiments detailed herein are not limited to any one particular type of network.

Figure 1:
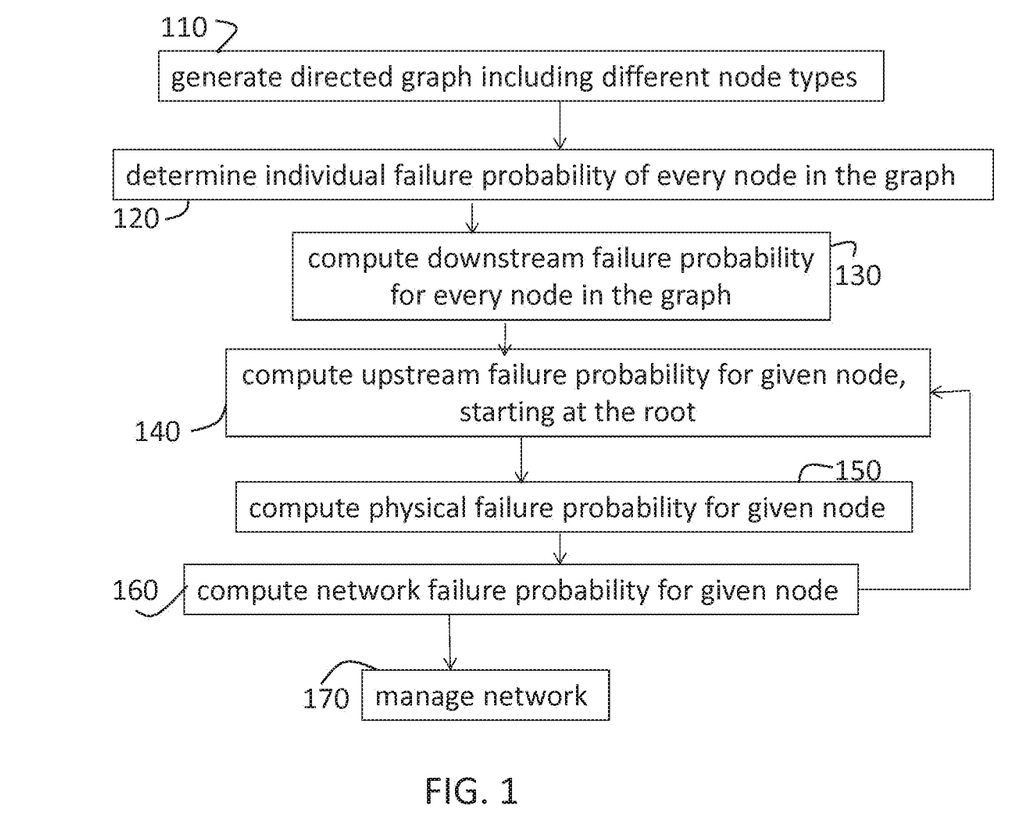
FIG. 1 is a process flow of a method of managing a network according to embodiments of the invention.

FIG. 1 is a process flow of a method of managing a network according to embodiments of the invention. Throughout the discussion herein, asset and node are used interchangeably because the representation of the assets in a directed graph is as nodes. At block 110, generating a directed graph including different node types refers to known techniques for graphing the nodes of the network in a way that shows their interconnections, as further discussed and illustrated below. Determining individual failure probability of every node in the graph at block 120 is independent of interrelationships among nodes, as discussed below. Computing downstream failure probability for every node in the graph, at block 130, involves computing the probability of a failure downstream of a given node due to the given node, as detailed below. Computing the upstream failure probability for a given node, at block 140, involves an iterative process starting at the first or root node of the graph, as detailed below. The processes include computing physical failure probability for the given node at block 150 and computing network failure probability for the given node at block 160. Based on the computations and determinations that are further discussed below, managing the network at block 170 may include mitigating failures based on their probability.

Figure 2:
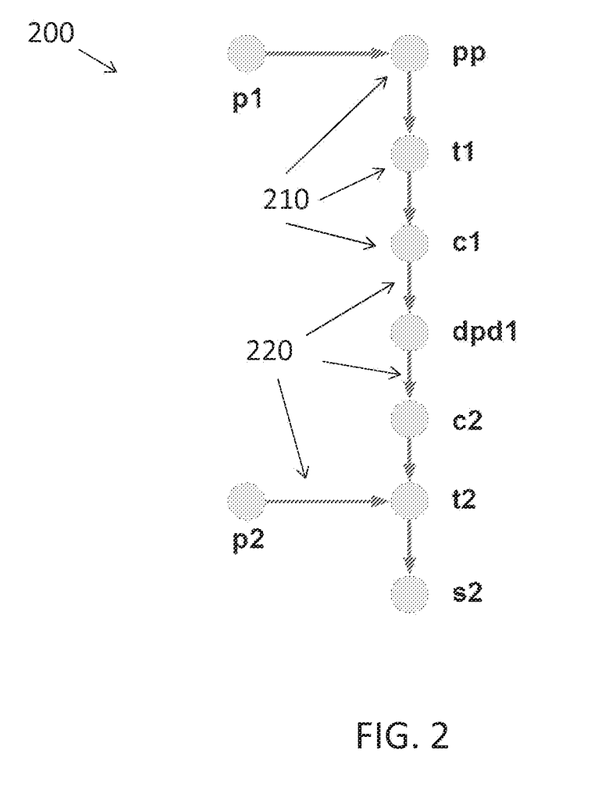
FIG. 2 is an exemplary graph used to identify nodes and connections for embodiments of the invention.

FIG. 2 is an exemplary graph 200 used to identify nodes 210 and connections 220 for embodiments of the invention. Several nodes 210 of electrical and non-electrical (physical) assets are shown with connections 220 indicating the physical topology of the network. In the exemplary graph 200, the nodes 210 include non-electrical or physical assets—poles p1, p2—and electrical assets—transformers t1, t2, cables c1, c2, source pp, and endpoint s2—as well as an electrical protective device (e.g., fuse) dpd1. Steps involved in the generation of the graph 200 are known and are not detailed here. Generally, the physical topology is converted into a list of edges. Each edge is an ordered pair of two assets, and it is assumed that electric power flows from the first asset to the second in the ordered pair. The assets are represented by the nodes 210 and the connectivity 220 is defined by the edges. Each of the nodes 210 is classified as a protective electrical asset (e.g., fuse, dynamic protective device) that is able to stop the propagation of a failure, a non-protective electrical asset (e.g., transformer) that does not have any inbuilt protective feature, or a physical asset (e.g., pole) that only has the purpose to house or support an electrical asset in some way. In the exemplary graph 200, the node 210 pp is the root node (first electrical asset) for purposes of determining upstream failure probability (140, FIG. 1), which is detailed further below. As noted above, the embodiments detailed herein are not limited to a power network. In a gas network, for example, the assets may be protective gas assets (e.g., check valves), gas assets (e.g., gas pipes, junctions, pumps), and physical assets (e.g., the pipe section supports).

The individual failure probability of each node is determined at block 120 as:

$$P_f(i) \forall i \in N \quad [\text{EQ. 1}]$$

N is the set of all nodes of the graph (e.g., all nodes 210 of graph 200, FIG. 2). The reliability R(i) of a given node i may be computed from the failure probability as:

$$R(i) = 1 - P_f(i) \quad [\text{EQ. 2}]$$

The processes involved in determining individual failure include investigating historical failures of each recorded asset failure incident over a specified time period and determining the relationship of the failure rate with attributes of the asset such as, for example, asset type, make, material, and age in order to generate a training model. Once the training model has been generated, failure rates for all nodes (i.e., assets with and without recorded failure histories) may be extrapolated from the training model.

Figure 3:
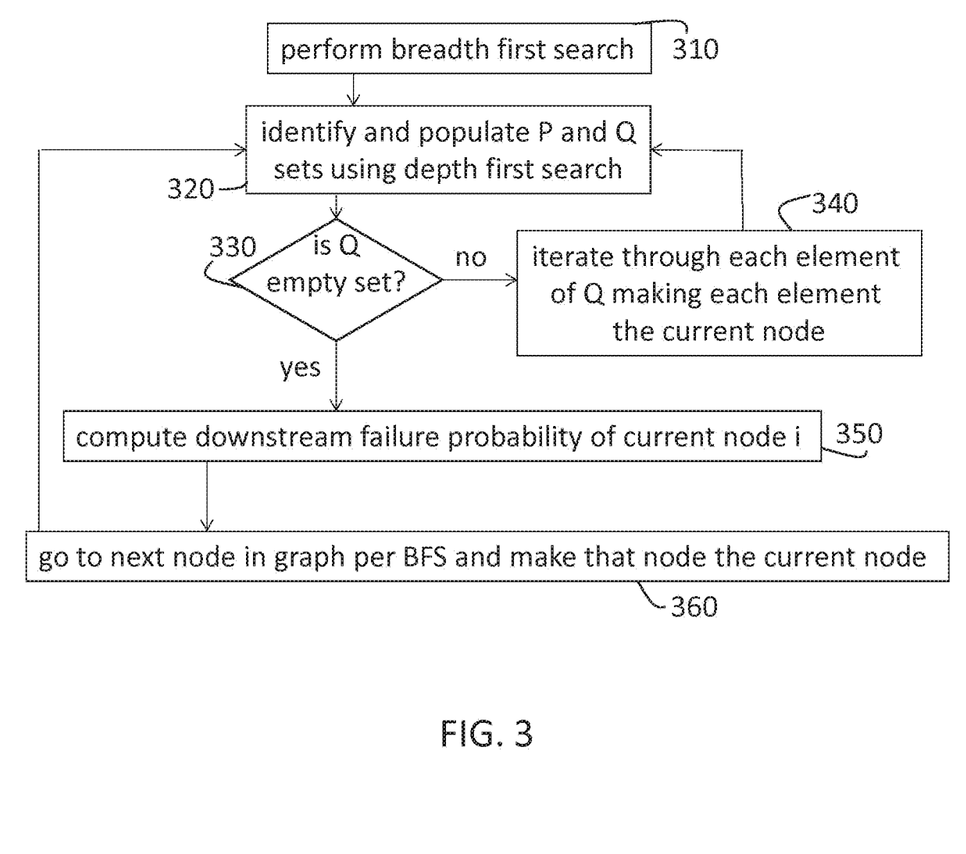
FIG. 3 shows processes involved in computing downstream failure probability at block 130 (FIG. 1) for every node according to an embodiment.

FIG. 3 shows processes involved in computing downstream failure probability at block 130 (FIG. 1) for every node according to an embodiment. At block 310, performing a breadth first search (BFS) involves traversing the graph (e.g., 200 in FIG. 2) by beginning with the root node (e.g., pp in FIG. 2) and progressing through the nodes (210, FIG. 2) one-at-a-time from the root to its neighbors. At block 320, identifying and populating two sets of (downstream) children nodes P and Q using depth first search (DFS) means that each branch from the root node to the last node of the branch is traversed before back-tracking to explore each node of the next branch all the way through. P refers to all non-protective electrical assets that are downstream of the current node and which do not have a protective electrical asset in the path to the current node. If P is being calculated for a sub-node in a branch (in the recursive part of the DFS algorithm), then the P of the current node should not include elements from the P set of the main node of the branch (i.e., elements of the P set will not be repeated). Q refers to all protective electrical assets that are downstream of the current node and do not have any other protective electrical assets in the path to the current node. As an example, if c1 shown in FIG. 2 were the current node, the P would be an empty set due to the protective electrical asset dpd1 (every other downstream node would have dpd1 in the path to c1, the current node), which is the next node after c1, and Q would include dpd1.

Based on the definitions of P and Q, the current node may be thought of as being in series with every element in P. That is, because of the absence of a protective electrical asset between the current node and the elements of P, a failure at any node that is an element in P can trigger a failure in the current node. Further, the current node may be thought of as being in series with every element in Q. However, the failure propagation is less straight-forward in this case. Two sub-cases emerge in considering the failure in an element (node) of Q. In a first case, when the protective electrical asset that is an element of Q works as expected, then any downstream failure in a node downstream of the protective electrical device (element of Q) will not affect the current node. In the second case, however, when the protective electrical asset (element of Q) fails, then a failure in a node downstream of the protective electrical asset (and the current node) will propagate and cause the current node to fail, as well. Both of these cases must be considered.

At block 330, it is determined if Q (the set of protective electrical assets downstream of the current node) is empty. If Q is not empty, then, at block 340, each element of Q is made the current node, and, at block 320, P and Q are identified for each current node. If Q is empty, then, at block 350, computing downstream failure probability for the current node i is performed. The probability of downstream failure ($P_{df}$) for the $i^{th}$ node is given by:

$$P_{df}(i) = 1 - R_{df}(i) \quad [\text{EQ. 3}]$$

$R_{df}$ is the downstream reliability of the current node and, with R indicating reliability, is given by:

$$R_{df}(i) = \prod_{j \in P} R(j) \prod_{k \in Q} [R(k) + (1 - R(k)) R_{df}(k)] \quad [\text{EQ. 4}]$$

At block 360, following computation of the probability of downstream failure, setting the next node in the graph as the current node is per the BFS.

Figure 4:
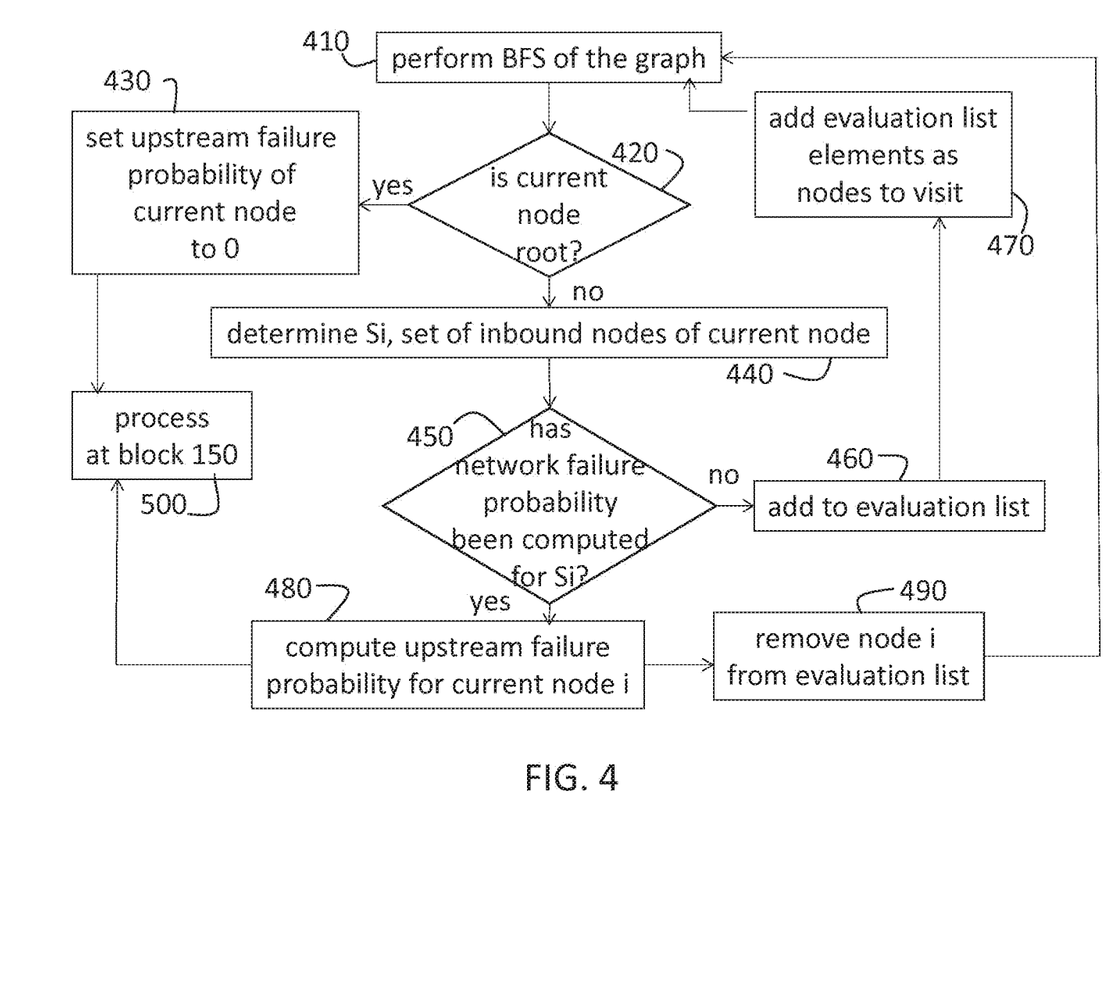
FIG. 4 shows the processes involved in computing upstream failure probability for a given node at block 140 (FIG. 1) according to an embodiment.

FIG. 4 shows the processes involved in computing upstream failure probability for a given node at block 140 (FIG. 1) according to an embodiment. At block 410, performing breadth-first searching (BFS) of the graph (e.g., 200, FIG. 2) involves beginning at the root node and moving through the graph to consider each node the current node one-at-a-time, as noted above. At block 420, it is determined whether the current node is the root node. If the current node is the root node, then the upstream failure probability of the current node is set to 0 at block 430. This is because the root node is the most upstream node in the graph (see e.g., p1 in FIG. 2). Thus, the probability of a failure upstream of the root node is 0. From block 430, the process at block 150

Figure 6:
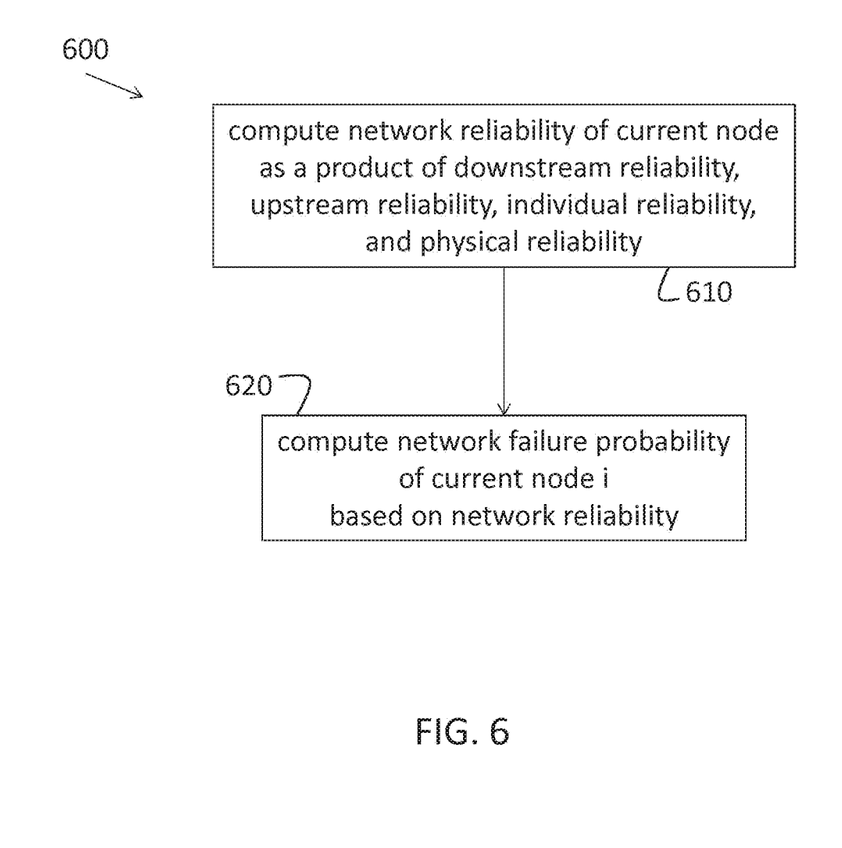
FIG. 6 shows the processes involved in computing network failure probability for each node at block 160 (FIG. 1) according to an embodiment.

(FIG. 1) is performed at block 500, as detailed below. If the current node is not the root node, then, at block 440, determining Si, the set of inbound nodes of the current node i is performed. The set of inbound nodes is the set of immediate parents of the current node i. At block 450, it is determined whether the network failure probability has already been computed for every node that is an element of the set Si. As detailed below with reference to EQ. 5, the network failure probability of every node in the set Si is determined using a modified directed graph G' that excludes the current node i. The network failure probability refers to the process completed at block 160 (FIG. 1) for the parent nodes (using G'). That is, because a current node may have multiple nodes in the set Si (multiple immediate parents), the loop defined by blocks 450, 460, and 470 ensures that the process shown at FIGS. 4 through 6 is completed for every parent node before the child node is evaluated.

If it is determined at block 450 that the network failure probability has not been computed for every node in the set Si of the current node, then, at block 460, the nodes in Si that have not had network failure probability computed are added to an evaluation list. At block 470, the nodes in the evaluation list are added as nodes to visit (i.e., nodes to process according to the steps shown in FIG. 4). If it is determined at block 450 that the network failure probability ($P_{inf}$) has been computed for every node in the set Si of the current node (every immediate parent of the current node), then, at block 480, upstream failure probability is computed for the current node i. The computation of upstream failure probability $P_{uf}$ of node i is given by:

$$P_{uf}(i) = \prod_{j \in S_i} P_{ufG'}(j) \qquad [EQ. 5]$$

The computation at EQ. 5 requires consideration of a modified directed graph G' in which the current node i is omitted. The upstream failure probability of the current node i is based on the network failure probability of each immediate parent node of node i (each node in the set Si). By determining the network failure probability of each node in the set Si based on the modified directed graph G' (which does not include the current node i), the failure probabilities of nodes downstream of i (in the original directed graph) are not counted multiple times (once for each j). Once the upstream failure probability is computed at block 480, the node i is removed from the evaluation list at block 490 and the next node is considered at block 410. Additionally, once the upstream failure probability is computed at block 480, the process at block 150 (FIG. 1) is performed at block 500 as detailed below.

Figure 5:
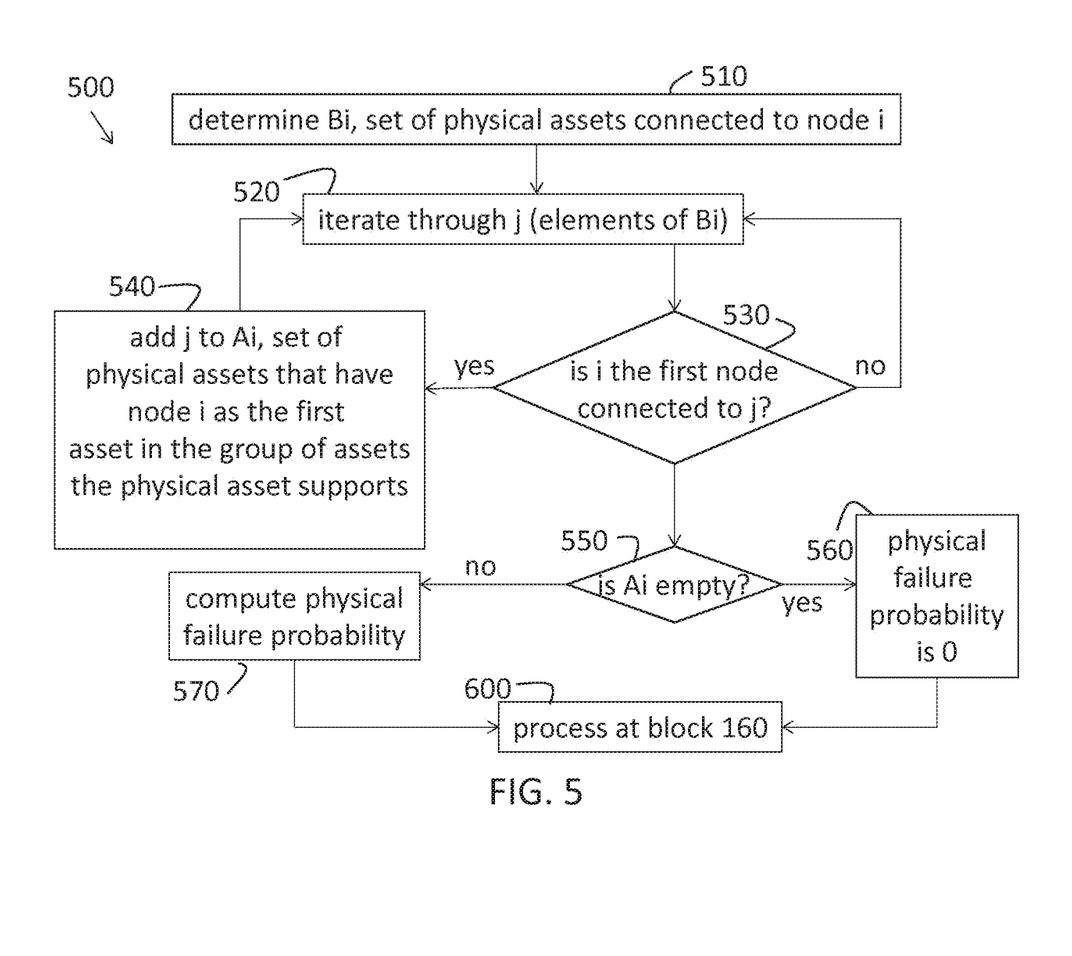
FIG. 5 shows the processes involved in computing physical failure probability for each node at block 150 (FIG. 1) according to an embodiment.

FIG. 5 shows the processes 500 involved in computing physical failure probability for each node at block 150 (FIG. 1) according to an embodiment. As FIG. 4 indicates and as discussed above, the processes 500 to implement block 150 (FIG. 1) are reached in multiple ways, each of which ensures that the physical failure probability is considered for each node as the current node. At block 510, determining the set of nodes Bi includes determining the set of physical assets connected to the current node i. In the exemplary graph 200 of FIG. 1, if the current node were pp, then the set of Bi would be comprised of p1, the pole that is directly connected to pp. The pole p2 is not part of Bi when the current node is pp. At block 520, iterating through each element j of Bi begins, at block 530, with determining if the current node i is the first node among the nodes (electrical assets) that are connected to element j of the set Bi. That is, in the example discussed with reference to FIG. 2, if pp were the current node i, then pp is the first node (according to the directed graph) among the electrical assets that are connected to p1 when j is such that the element of Bi is p1. If the current node i is not the first node among the (electrical asset) nodes that are connected to the current j element of Bi, then processing returns to block 520 to select the next element in Bi. If the current node i is the first node among the (electrical asset) nodes that are connected to the current j element of Bi, then the physical asset j is added to Ai, which is the set of physical assets that have node i as the first (electrical) asset in the group of assets the physical asset supports, at block 540. From block 540, the next physical asset j is selected at block 520.

When all the physical assets in Bi have been processed, then, at block 550, it is determined if Ai is an empty set. That is, it is determined if there are no physical assets for which the current node i is the first electrical asset in the group of assets that the physical asset supports. In exemplary FIG. 2, t1, for example, is not the first node supported by any physical asset. Thus, if the current node were t1, the resulting Ai would be an empty set. When Ai is an empty set, then the physical failure probability is set to 0 at block 560. When Ai is not an empty set, then the physical failure probability is computed at block 570. The computation of the physical failure probability is given by:

$$P_{pf}(i) = \prod_{j \in A_i} P_f(j) \qquad [EQ. 6]$$

Whether the physical failure probability is computed (at block 570) or set to 0 (at block 560), the process at block 160 (FIG. 1) is then performed as discussed with reference to FIG. 6.

FIG. 6 shows the processes 600 involved in computing network failure probability for each node at block 160 (FIG. 1) according to an embodiment. At block 610, network reliability for the current node i is computed as a product of downstream reliability, upstream reliability, individual reliability, and physical reliability. This network reliability is given by:

$$R_{nf}(i) = R(i) \cdot R_{df}(i) \cdot R_{uf}(i) \cdot R_{pf}(i) \qquad [EQ. 7]$$

EQ. 7 can also be written as:

$$R_{nf}(i) = (1 - P_f(i)) \cdot (1 - P_{df}(i)) \cdot (1 - P_{uf}(i)) \cdot (1 - P_{pf}(i)) \qquad [EQ. 8]$$

Based on the computed network reliability, network failure probability associated with the current node i may be computed as:

$$P_{nf}(i) = 1 - R_{nf}(i) \qquad [EQ. 9]$$

The processes detailed above provide information about the probability of network failure associated with each given electrical asset. As such, at block 70 (FIG. 1), management of the network can take into account the information generated by the other processes. For example, a node (electrical asset) with a high $P_{nf}$ according to EQ. 9 may be scheduled for inspection and maintenance more frequently than a node with a relatively lower $P_{nf}$. As another example, a threshold may be set for the $P_{nf}$ of any node such that any node whose $P_{nf}$ exceeds the threshold will be maintained as a critical asset. That maintenance may entail more frequency inspection and testing or replacement, for example.

Figure 7:
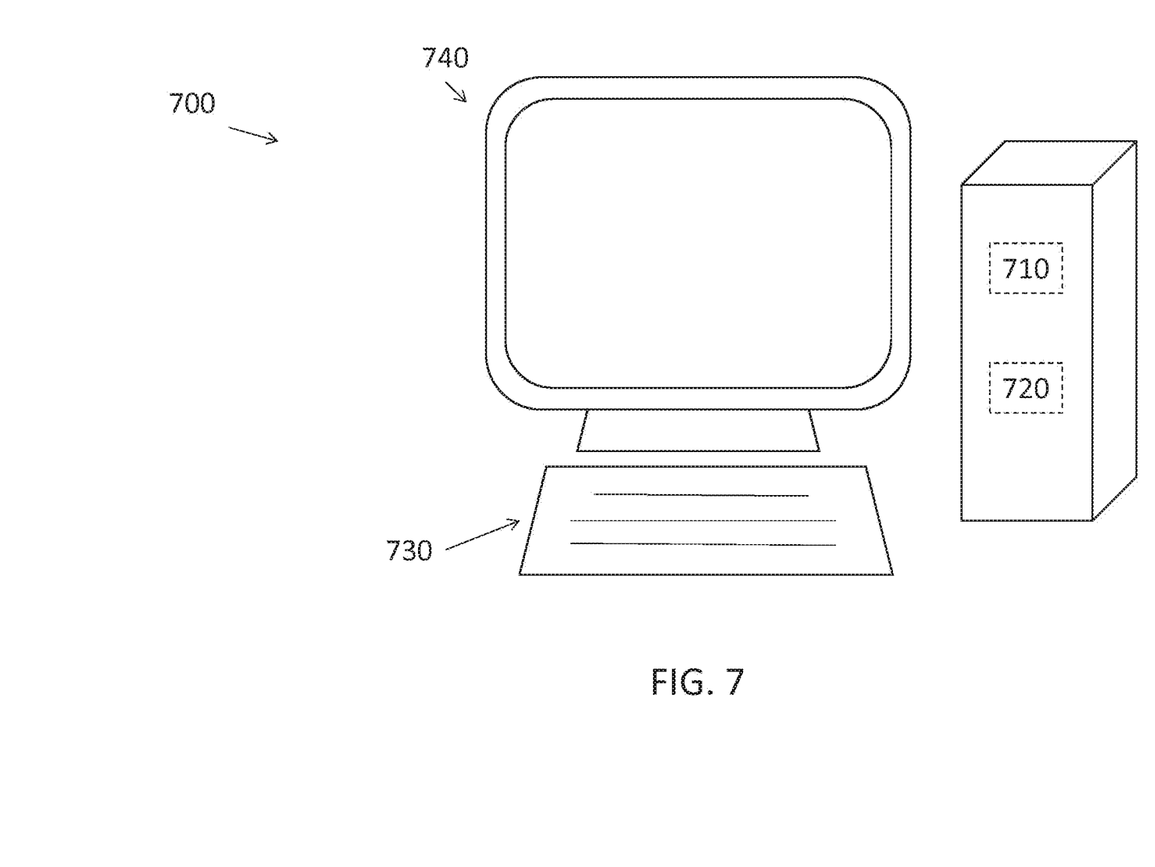
FIG. 7 is a block diagram of a processing system to implement embodiments of the invention.

FIG. 7 is a processing system 700 configured to implement embodiments described herein. The processes detailed herein may be implemented by one or more processors (processing circuits) 710 based on instructions stored in one or more memory devices 720. The memory devices 720 may additionally store the training model discussed with reference to block 120 (FIG. 1), for example. The instructions and one or more memory devices 720 represent a computer program product to implement the detailed processes. The processing system 700 may additionally include an input interface 730 (e.g., keyboard, wired or wireless communication link) to receive commands or data, as well as an output interface 740 (e.g., display device, communication link) to send output. The computer program product (720) and processor 710 may be stand-alone components or may be integrated with other components of the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention. Further, as noted above, although an electrical network is predominantly discussed as an exemplary network, the flow diagrams herein and the discussion pertain to any network with assets in which failures may propagate in both directions from the perspective of a directed graph.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a network with utility assets of an electrical grid, the method comprising:
    generating, using a processor, a directed graph with each of the utility assets represented as a node in the directed graph, the utility assets including electrical assets of the electrical grid;
    determining a historical failure rate for each node of at least a portion of the utility assets over a predetermined period of time;
    determining a relationship of the historical failure rates with one or more physical attributes of one or more of the utility assets;
    generating a training model based on the historical failure rates and the relationships of the historical failure rates with the one or more physical attributes of the one or more utility assets;
    determining, using the training model, an individual failure probability of each node;
    computing, using the processor, a downstream failure probability of each of at least a subset of the nodes of the directed graph according to an arrangement of the nodes in the directed graph, the computing the downstream failure probability including:
        determining whether a path between a selected node of the at least a subset of nodes and a particular node of the directed graph, and
        computing the downstream failure probability of the selected node based on the determination regarding the path;
    computing, using the processor, an upstream failure probability of each node of the at least the subset of nodes according to the arrangement of the nodes in the directed graph;
    computing a network failure probability for each node of the at least the subset of nodes based on the corresponding individual failure probability, the corresponding downstream failure probability, and the corresponding upstream failure probability; and
    increasing frequency of inspection of one or more nodes based on the network failure probability of the nodes probability.

2. The method according to claim 1, further comprising classifying each node in the directed graph.

3. The method according to claim 2, wherein the network is an electric power network and the classifying each node includes classifying each node as a non-protective electrical asset, a protective electrical asset, or a physical asset.

4. The method according to claim 3, wherein the protective electrical asset stops the propagation of a failure of one or more other assets through the electrical grid.

5. The method according to claim 1, wherein the determining the individual failure probability of each node includes extrapolating from the training model that is trained with historical data.

6. The method according to claim 1, wherein the computing the downstream failure probability for each node is based on a classification of one or more assets downstream of the node.

7. The method according to claim 1, wherein the computing the upstream failure probability for each node involves an iterative process.

8. The method according to claim 7, wherein the computing the upstream failure probability for each node is based on the network failure probability of upstream nodes of a modified directed graph that omits the node.

9. The method according to claim 7, wherein the computing the network failure probability for each node is also based on a physical failure probability.

10. The method according to claim 1, wherein the managing the network based on the network failure probability of the utility assets includes setting a threshold network failure probability and, when the network failure probability of one of the utility assets exceeds the threshold network failure probability, managing the one of the utility assets as a critical asset.

11. The method according to claim 1, wherein, the physical attributes includes an asset type, an asset make, an asset material, or an asset age.

12. A nontransitory computer readable medium including executable instructions, the instructions being executable by one or more processors to perform a method for managing a network with utility assets of an electrical grid, the method comprising:
  generating a directed graph with each of the utility assets represented as a node in the directed graph, the utility assets including electrical assets of the electrical grid;
  determining a historical failure rate for each node of at least a portion of the utility assets over a predetermined period of time;
  determining a relationship of the historical failure rates with one or more physical attributes of one or more of the utility assets;
  generating a training model based on the historical failure rates and the relationships of the historical failure rates with the one or more physical attributes of the one or more utility assets;
  determining, using the training model, an individual failure probability of each node;
  computing a downstream failure probability of each of at least a subset of the nodes of the directed graph according to an arrangement of the nodes in the directed graph, the computing the downstream failure probability including:
    determining whether a path between a selected node of the at least a subset of nodes and a particular node of the directed graph, and
    computing the downstream failure probability of the selected node based on the determination regarding the path;
  computing an upstream failure probability of each node of the at least the subset of nodes according to the arrangement of the nodes in the directed graph;
  computing a network failure probability for each node of the at least the subset of nodes based on the corresponding individual failure probability, the corresponding downstream failure probability, and the corresponding upstream failure probability; and
  increasing frequency of inspection of one or more nodes based on the network failure probability of the nodes probability.

13. The nontransitory computer readable medium according to claim 12, the method further comprising classifying each node in the directed graph.

14. The nontransitory computer readable medium according to claim 13, wherein the network is an electric power network and the classifying each node includes classifying each node as a non-protective electrical asset, a protective electrical asset, or a physical asset.

15. The nontransitory computer readable medium according to claim 14, wherein the protective electrical asset stops the propagation of a failure of one or more other assets through the electrical grid.

16. The nontransitory computer readable medium according to claim 12, wherein the determining the individual failure probability of each node includes extrapolating from the training model that is trained with historical data.

17. The nontransitory computer readable medium according to claim 12, wherein the computing the downstream failure probability for each node is based on a classification of one or more assets downstream of the node.

18. The nontransitory computer readable medium according to claim 12, wherein the computing the upstream failure probability for each node involves an iterative process.

19. The nontransitory computer readable medium according to claim 18, wherein the computing the upstream failure probability for each node is based on the network failure probability of upstream nodes of a modified directed graph that omits the node.

20. The nontransitory computer readable medium according to claim 18, wherein the computing the network failure probability for each node is also based on a physical failure probability.

21. The nontransitory computer readable medium according to claim 12, wherein the managing the network based on the network failure probability of the utility assets includes setting a threshold network failure probability and, when the network failure probability of one of the utility assets exceeds the threshold network failure probability, managing the one of the utility assets as a critical asset.

22. The nontransitory computer readable medium according to claim 12, wherein, the physical attributes includes an asset type, an asset make, an asset material, or an asset age.

23. A system comprising:
  one or more processors; and
  memory including instructions executable by the one or more processors to:
    generate a directed graph with each of utility assets represented as a node in the directed graph, the utility assets including electrical assets of an electrical grid;
    determine a historical failure rate for each node of at least a portion of the utility assets over a predetermined period of time;
    determine a relationship of the historical failure rates with one or more physical attributes of one or more of the utility assets;
    generate a training model based on the historical failure rates and the relationships of the historical failure rates with the one or more physical attributes of the one or more utility assets;
    determine, using the training model, an individual failure probability of each node;
    compute a downstream failure probability of each of at least a subset of the nodes of the directed graph according to an arrangement of the nodes in the directed graph, the computing the downstream failure probability including the one or more processors to:
      determine whether a path between a selected node of the at least a subset of nodes and a particular node of the directed graph, and
      compute the downstream failure probability of the selected node based on the determination regarding the path;

compute an upstream failure probability of each node of the at least the subset of nodes according to the arrangement of the nodes in the directed graph;

compute a network failure probability for each node of the at least the subset of nodes based on the corresponding individual failure probability, the corresponding downstream failure probability, and the corresponding upstream failure probability; and increase frequency of inspection of one or more nodes based on the network failure probability of the nodes probability.

\* \* \* \* \*